(12) United States Patent
Tonchia (10) Patent No.: US 9,016,227 B2
(45) Date of Patent: Apr. 28, 2015

(54) ANTI-BARNACLE NET AND METHOD

(75) Inventor: Hélène Tonchia, Antony (FR)

(73) Assignee: Cggveritas Services SA, Massy Cedex (FR)

( * ) Notice: Subject to any disclaimer, the term of this patent is extended or adjusted under 35 U.S.C. 154(b) by 540 days.

(21) Appl. No.: 13/421,988

(22) Filed: Mar. 16, 2012

(65) Prior Publication Data

US 2012/0250458 A1   Oct. 4, 2012

Related U.S. Application Data

(60) Provisional application No. 61/469,970, filed on Mar. 31, 2011.

(51) Int. Cl.
   *G01V 1/38*     (2006.01)
   *G01V 1/20*     (2006.01)
   *B63B 59/04*    (2006.01)

(52) U.S. Cl.
   CPC ............... *G01V 1/201* (2013.01); *B63B 59/045* (2013.01); *G01V 1/3843* (2013.01)

(58) Field of Classification Search
   CPC ......... B63B 35/04; B63B 59/045; H02G 1/10
   USPC ................................ 114/253, 254; 57/31, 32
   See application file for complete search history.

(56) References Cited

U.S. PATENT DOCUMENTS

| | | | | |
|---|---|---|---|---|
| 2,940,247 A * | 6/1960 | Kirschbaum | ...................... | 57/7 |
| 3,067,712 A * | 12/1962 | Doerpinghaus | .............. | 114/74 T |
| 3,339,368 A * | 9/1967 | Ezoe et al. | ..................... | 405/164 |
| 3,482,034 A * | 12/1969 | Rhoades et al. | .......... | 174/102 R |
| 3,509,848 A * | 5/1970 | Salmon | ........................ | 114/245 |
| 3,744,016 A * | 7/1973 | Davis | ............................ | 367/154 |
| 3,900,543 A * | 8/1975 | Davis | ........................... | 264/45.3 |
| 4,010,619 A * | 3/1977 | Hightower et al. | ........... | 405/191 |
| 4,161,155 A * | 7/1979 | Cloutier | ....................... | 114/227 |
| 5,226,380 A | 7/1993 | Fisher | | |
| 5,299,530 A * | 4/1994 | Mukadam et al. | ............. | 119/223 |
| 5,315,949 A * | 5/1994 | Bradley | ........................ | 114/222 |
| 6,197,137 B1 * | 3/2001 | Akahani et al. | ................. | 156/71 |
| 6,303,078 B1 * | 10/2001 | Shimizu et al. | .................... | 422/8 |
| 6,325,015 B1 * | 12/2001 | Garcia et al. | .................. | 114/382 |
| 6,426,464 B1 * | 7/2002 | Spellman et al. | .......... | 174/101.5 |
| 7,303,659 B2 * | 12/2007 | Inagaki et al. | ........... | 204/196.37 |
| 7,515,719 B2 * | 4/2009 | Hooley et al. | .................... | 381/18 |
| 7,835,222 B2 | 11/2010 | Lobe et al. | | |
| 8,541,439 B2 * | 9/2013 | Eyster et al. | ................... | 514/291 |
| 2002/0114218 A1 * | 8/2002 | Lee et al. | ...................... | 367/140 |
| 2004/0151325 A1 * | 8/2004 | Hooley et al. | ................... | 381/18 |
| 2006/0054498 A1 * | 3/2006 | Inagaki et al. | ........... | 204/196.01 |
| 2006/0254491 A1 * | 11/2006 | Seiple | .......................... | 114/253 |
| 2008/0279636 A1 * | 11/2008 | Ray et al. | ...................... | 405/173 |
| 2009/0316526 A1 * | 12/2009 | Grall | .............................. | 367/20 |
| 2009/0324338 A1 * | 12/2009 | Thompson et al. | ........... | 405/158 |
| 2010/0020644 A1 | 1/2010 | Vignaux | | |
| 2011/0174207 A1 | 7/2011 | Harrick et al. | | |

(Continued)

FOREIGN PATENT DOCUMENTS

WO      2012/006687 A1      1/2012

*Primary Examiner* — Ari M Diacou
(74) *Attorney, Agent, or Firm* — Patent Portfolio Builders PLLC (57) ABSTRACT

Method and an array of streamers that prevent/slow down marine animals to attach to the streamers. The array includes at least one streamer including plural sections; and a net provided over at least one section of the at least one streamer.

17 Claims, 6 Drawing Sheets

(56) References Cited

U.S. PATENT DOCUMENTS

| | | | |
|---|---|---|---|
| 2012/0009236 A1* | 1/2012 | Eyster et al. | 424/402 |
| 2012/0275275 A1* | 11/2012 | Tonchia | 367/153 |
| 2013/0101355 A1* | 4/2013 | Thompson et al. | 405/166 |
| 2013/0144326 A1* | 6/2013 | Brady et al. | 606/200 |
| 2013/0184739 A1* | 7/2013 | Brady et al. | 606/200 |
| 2014/0037384 A1* | 2/2014 | Moeller | 405/158 |

* cited by examiner

ANTI-BARNACLE NET AND METHOD

CROSS-REFERENCE TO RELATED APPLICATIONS

The present application is related to and claims the benefit of priority of U.S. Provisional Application Ser. No. 61/469,970, having the title "Anti-Barnacle Net and Method," filed on Mar. 31, 2011, and being authored by H. Tonchia, the entire content of which is incorporated herein by reference.

BACKGROUND

1. Technical Field

Embodiments of the subject matter disclosed herein generally relate to methods and systems and, more particularly, to mechanisms and techniques for preventing various marine animals from attaching to seismic equipment.

2. Discussion of the Background

Marine seismic data acquisition and processing generate a profile (image) of the geophysical structure (subsurface) under the seafloor. This profile is used by those trained in the field, to evaluate the presence or absence of oil and/or gas reservoirs. Thus, providing a high-resolution image of the subsurface is an ongoing process.

Figure 1:
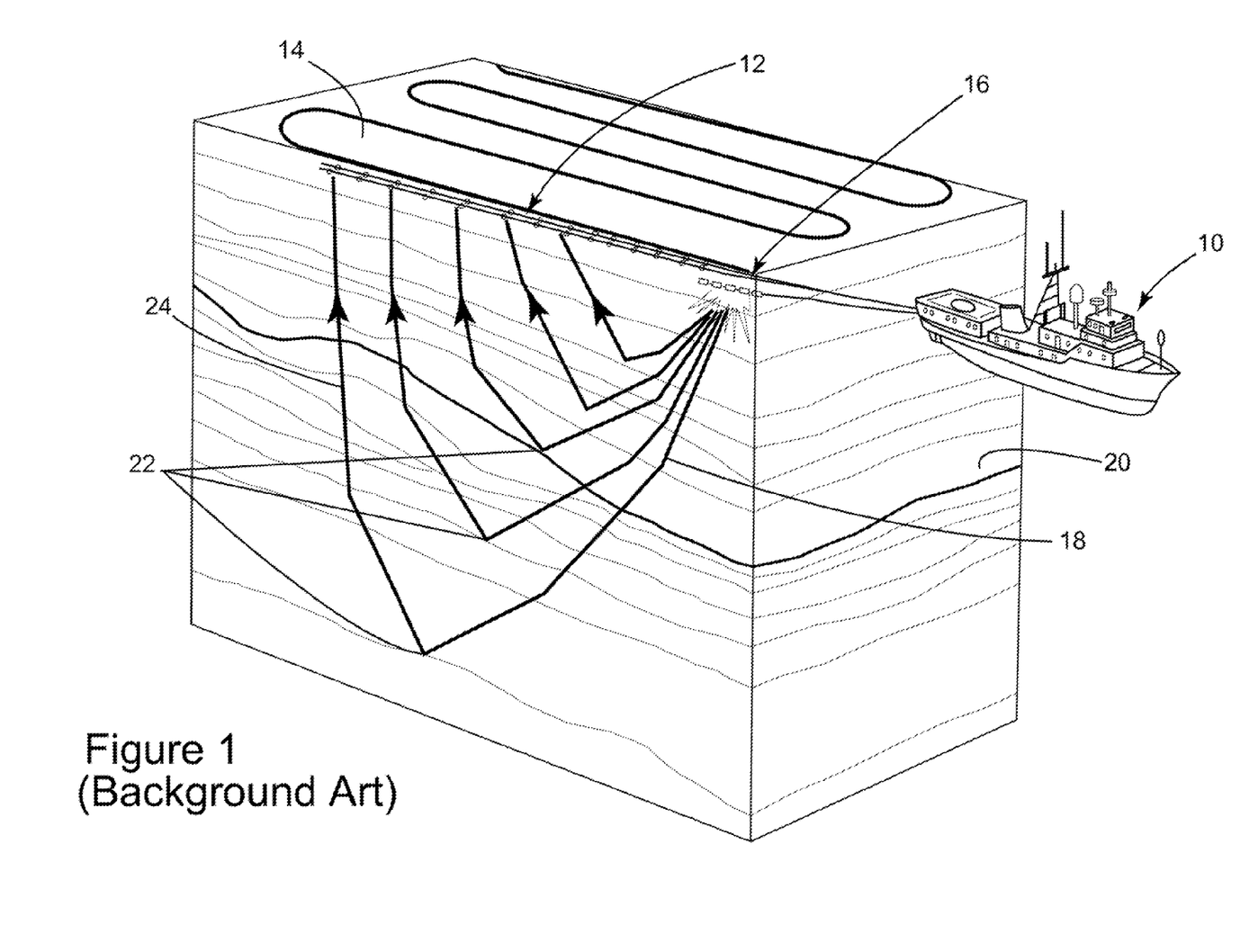
FIG. 1 is a schematic diagram of a conventional seismic data acquisition configuration.

During a seismic gathering process, as shown in FIG. 1, a vessel 10 tows an array of seismic detectors provided on streamers 12. The streamers may be disposed horizontally, i.e., lying at a constant depth relative to a surface 14 of the ocean. The vessel 10 also tows a sound source assembly 16 that is configured to generate an acoustic wave 18. The acoustic wave 18 propagates downwards toward the seafloor 20 and penetrates the seafloor until eventually a reflecting structure 22 (reflector) reflects the acoustic wave. The reflected acoustic wave 24 propagates upwardly until is detected by a detector on streamer 12.

The above-noted arrangement is towed under water for days if not weeks for a given survey. Thus, it was noted that various marine animals, e.g., barnacles, attach to various components of the streamer, e.g., electronic components, birds, cables, etc. The barnacles may change a desired weight of the streamer, may make the streamer deviate from its desired towed position or simply may make it difficult to manipulate the streamer for maintenance or when deployed under water.

Accordingly, it would be desirable to provide systems and methods that avoid the afore-described problems and drawbacks, i.e., that prevent or reduce the amount of deposits on the equipment when under water.

SUMMARY

According to one exemplary embodiment, there is an array of streamers to be used for a seismic survey. The array includes at least one streamer including first and second sections, each section including at least a receiver for recording seismic data; and a net provided over the first section to prevent barnacles to attach to the at least one streamer.

According to another exemplary embodiment, there is a method for providing a net over a streamer. The method includes rolling out the streamer from a vessel; providing over the streamer a net for preventing barnacles to attach to the streamer; and releasing the streamer covered with the net into water for performing seismic survey.

According to still another exemplary embodiment, there is a method for removing a net from a streamer when the streamer is brought back on a vessel. The method includes releasing a streamer, from the vessel, into water, wherein at least a section of the streamer is covered with a net; recording seismic data with the streamer; retrieving the streamer back on the vessel; and removing the net from the at least a section of the streamer when the streamer is on the vessel.

BRIEF DESCRIPTION OF THE DRAWINGS

The accompanying drawings, which are incorporated in and constitute a part of the specification, illustrate one or more embodiments and, together with the description, explain these embodiments. It is noted that no dimensions should be inferred from the drawings unless specifically indicated in the specification. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a streamer having a net for preventing barnacles to attach to the streamer. However, the embodiments to be discussed next are not limited to barnacles, but may be applied to other marine organisms.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a section of a streamer that is protected by a net. The net is configured to completely or almost completely enclose the section of the streamer or an equipment attached to the section so that marine animals are prevented to reach the streamer or to directly contact the streamer. In one exemplary embodiment, less marine animals reach the section or equipment due to the novel net.

Figure 2:
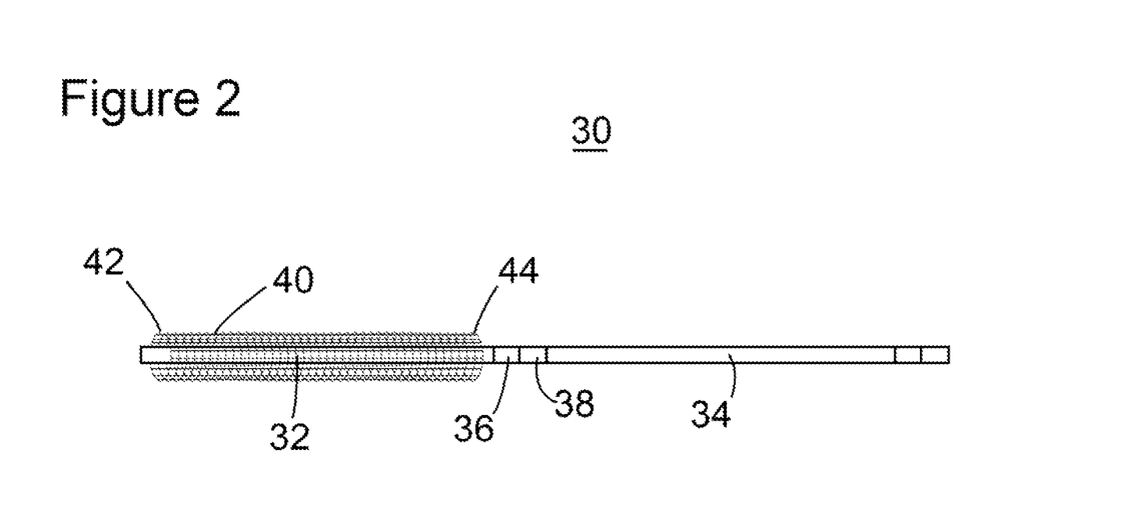
FIG. 2 is a schematic diagram of a streamer provided with a net according to an exemplary embodiment.

According to an exemplary embodiment shown in FIG. 2, a streamer 30 is shown having two sections 32 and 34. A streamer has more than two sections in real applications but FIG. 2 shows two sections for simplicity. A section may be around 100 to 300 m long. The sections are attached to each other through some equipment. For example, an electronic box 36 may be provided between the two sections. The electronic box 36 may include at least one of an amplifier, cables for transmitting data from a section to the other, a control device and/or a processor, memory, a seismic sensor, etc. Another device that might be provided between two sections is a bird 38. The bird is a device that helps to control a position (lateral and/or vertical) of the streamer 10.

A net 40 (e.g., stocking, web, mesh, network, etc.) may be provided on/over one or more sections of the streamer 30. The net 40 may extend along a single section of the streamer, multiple sections or the entire streamer. In one application, the net extends over the electronic box 36. The net 40 may be made of one or more pieces. The pieces may be attached to each other by various means, e.g., a zipper. The net 40 may have a first end 42 configured to be fixed relative to the corresponding section 32 of the streamer and a second end 44, opposite the first end 42, configured to be fixed to the section 32. Various mechanisms for fixing the ends 42 and 44 may be envisioned, e.g., a strip of Velcro or a rope to tie the ends or other means known in the art. These means should be able to withstand the currents experienced underwater and also to be easily removed.

Figure 3:
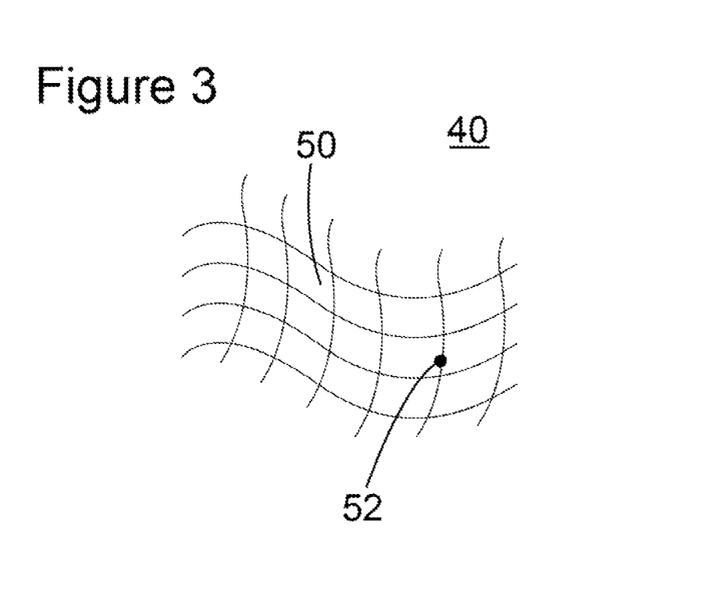
FIG. 3 is a schematic diagram of a net according to an exemplary embodiment.
Figure 4:
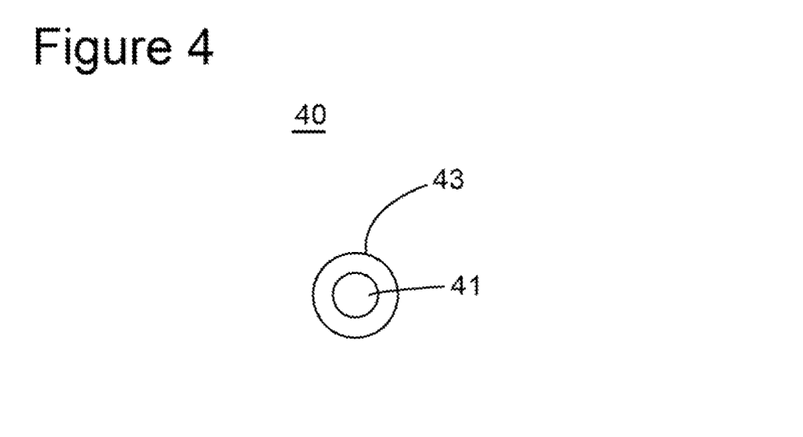
FIG. 4 is a schematic diagram of a strand of a net covered with a anti-stick or low-adhesion material according to an exemplary embodiment.
Figure 5:
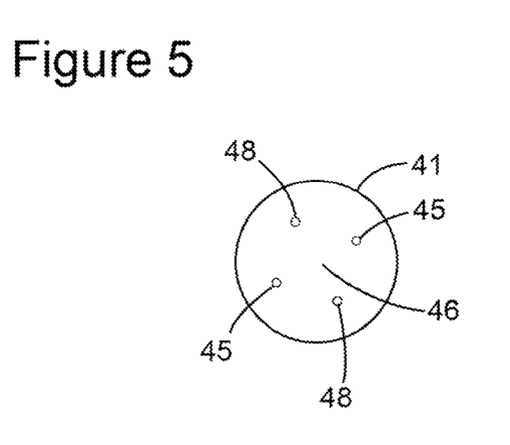
FIG. 5 is a schematic diagram of a strand of a net that includes threads of at least two different metallic materials according to an exemplary embodiment.

The net 40 may be made of a synthetic material, e.g., nylon, a natural material, e.g., hemp, a metal, e.g., copper, or any combination of these materials. In one application shown in FIG. 3, an average size of a cell 50 of the net 40 may have such dimensions so that a larva (e.g., average larva) of a barnacle cannot pass through the net 40. In still another application, the net 40 is impregnated with various chemical substances that are disliked by the barnacle. For example, the net or part of the net may be covered with an anti-stick or low-adhesion product, e.g., a silicon-based product. FIG. 4 shows a strand 41 of the net 40 being covered with the anti-stick or low-adhesion product 43. In another application, the synthetic material of the net may be mixed (e.g., knitted) together with metallic threads, e.g., copper, that are disliked by the barnacle to discourage them to settle on the streamer. FIG. 5 shows a strand 41 including the synthetic material 46 and metallic threads 45. In still another exemplary embodiment, the metallic threads may be made of different materials. For example, FIG. 5 shows the copper threads 45 but also threads 48 made of a different metal. According to this exemplary embodiment, an electrical current may be generated between the threads 45 and 48, which will deter the barnacles to approach and/or settle on the streamer. In yet another application, various small size reservoirs 52 may be placed at various places along the net 40 for storing and releasing the chemical substances (e.g., sponge-like material or a material with a controlled release rate of its components). In another exemplary embodiment, the reservoirs 52 may be substituted with a power source (e.g., battery) connected to metallic wires formed in the net 40 for generating a low current to prevent the marine animals to attach to the net.

In one exemplary embodiment, the net 40 is provided around the streamer 30 so that the net is neither tight nor loose. It was observed that the barnacles do not like vibrations of their support. Thus, the net 40 should be allowed to vibrate relative to the streamer when towed underwater to prevent the larva from attaching. It was also observed that barnacles do not get attached to any material, i.e., there are materials that are liked and materials that are disliked by the barnacles. Thus the materials from which the net is made may include the combinations discussed above, e.g., at least a material that is disliked by the barnacles. Various textures of the net may be used.

Figure 6:
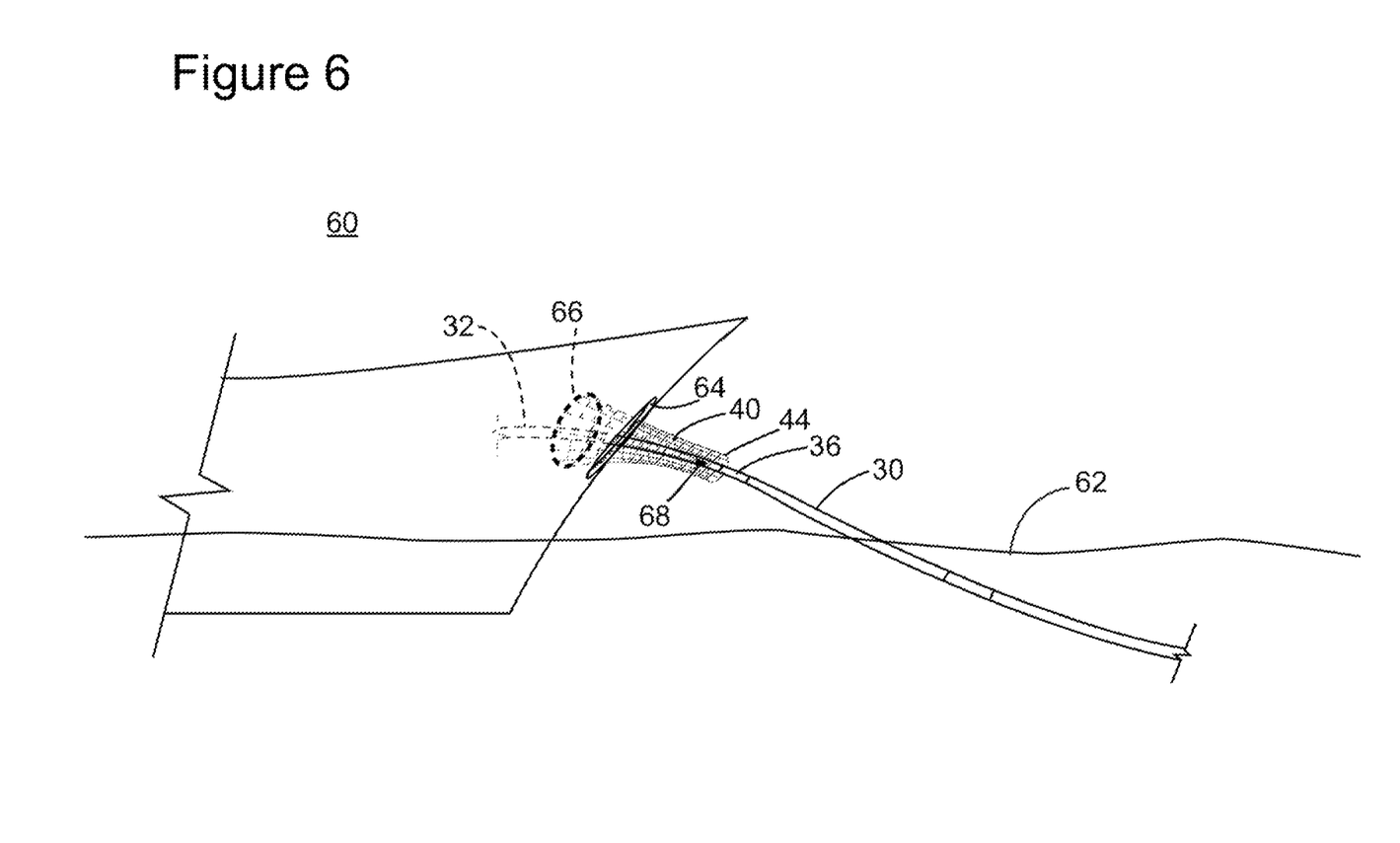
FIG. 6 is a schematic diagram of a device for providing a net over a streamer according to an exemplary embodiment.

According to an exemplary embodiment illustrated in FIG. 6, a device for providing the net on the streamer when deployed or before being deployed is discussed. FIG. 6 shows a vessel 60 that is floating at the surface 62 of the water. The streamer 30 is being deployed from an opening 64 of the vessel. A net distributor device 66 includes a supply of the net 40. As the section 32 of the streamer 30 enters through the net distributor device 66, the end 44 is tied to the section 32 and then the net 40 is provided around the section 32. After the section 32 is covered, the end 42 (see FIG. 2) is tied to the streamer. At this point the net may be cut and prepared for the next section or may be continuously provided along the streamer.

When a bird 38 is present on the streamer, it is not desirable that the bird is covered with the net as the bird needs to have its wings free to move. Thus, the net in FIG. 6 may be cut when a bird is encountered, i.e., no net is provided across the bird. In addition, the net distributor device 66 may have various slots that allow the bird to pass the device. In another exemplary embodiment, the net distributor device may have plural sections, each section having a part of the net 40. When the streamer 30 passes the device, these parts of the net 40 are assembled together around the streamer 30. Other approached may be envisioned.

According to another exemplary embodiment, some protection may be provided to the metallic parts of the streamer. For example, the electronic box 36 shown in FIG. 6 may be affected by corrosion when copper or other metals are woven into the net 40. For these situations, a piece of zinc 68 (or equivalent materials) may be placed on the streamer, close to the metallic part (e.g., electronic box 36) to prevent corrosion of the metallic part.

For removing the net from the streamer when the streamer is brought back on the vessel, a cutter may be used to cut and remove the net. Thus, when the streamer needs to be used again, a new net may be provided on the streamer. However, it is possible to maintain the net on the streamer when the streamer is rolled back on the vessel. In other words, the net may be reused by simply leaving the net on the streamer.

Figure 7:
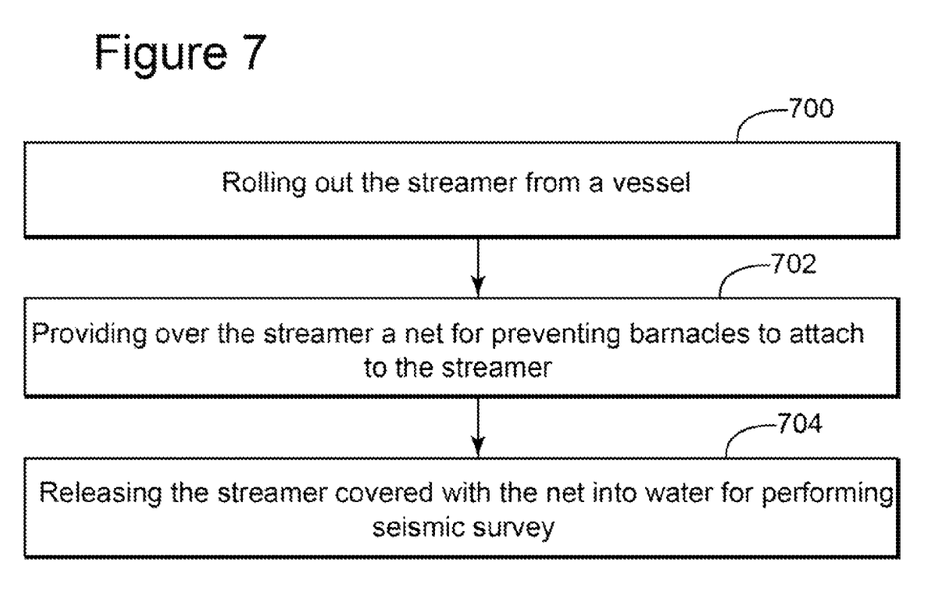
FIG. 7 is a flowchart of a method for providing a net over a streamer according to an exemplary embodiment.

According to an exemplary embodiment, there is a method for providing a net over a streamer. The method is illustrated in FIG. 7 and includes a step 700 of rolling out the streamer from a vessel; a step 702 of providing over the streamer a net for preventing barnacles to attach to the streamer; and a step 704 of releasing the streamer covered with the net into water for performing seismic survey.

Figure 8:
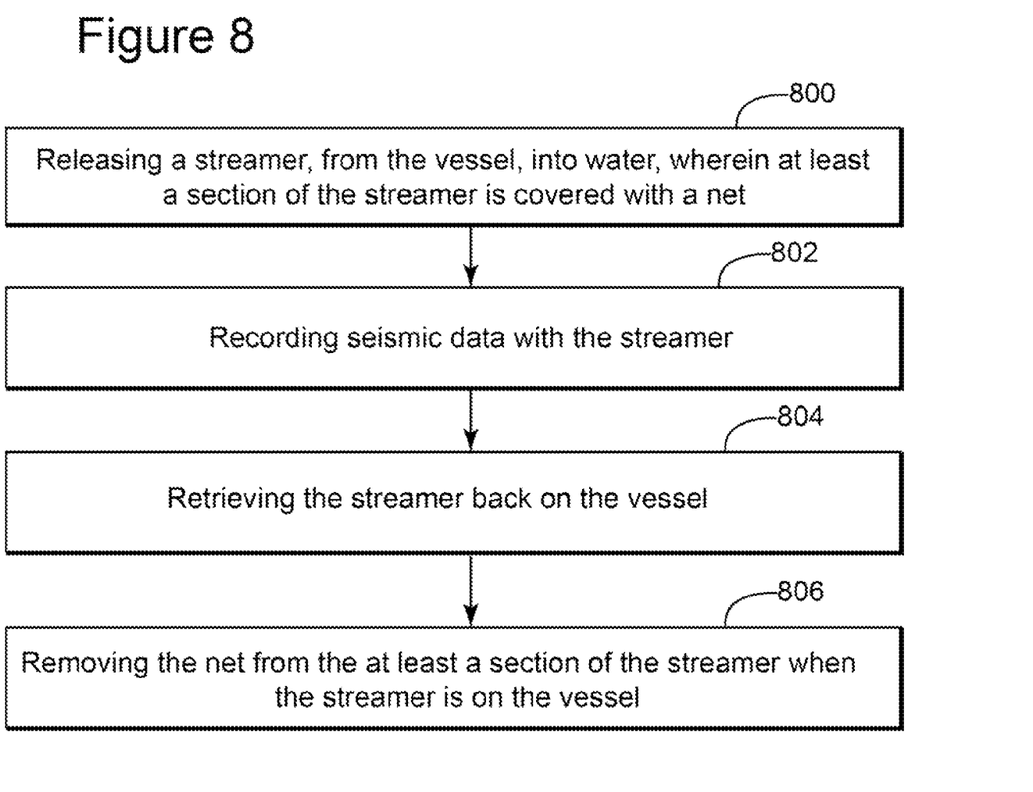
FIG. 8 is a flowchart of a method for removing a net from a streamer according to an exemplary embodiment.

According to another exemplary embodiment, there is a method for removing a net from a streamer when the streamer is brought back onto a vessel. The method is illustrated in FIG. 8 and includes a step 800 of releasing a streamer, from the vessel, into water, wherein at least a section of the streamer is covered with a net; a step 802 of recording seismic data with the streamer; a step 804 of retrieving the streamer back on the vessel; and a step 806 of removing (e.g., using a machine that cuts away) the net from the at least a section of the streamer when the streamer is back one the vessel.

The disclosed exemplary embodiments provide a system and a method for providing a net over a section of a streamer. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An array of streamers to be used for a seismic survey, the array comprising:
   at least one streamer including first and second sections, each section including at least a receiver for recording seismic data; and
   a net provided over the first section to prevent barnacles to attach to the at least one streamer,
   wherein the net is made of a combination of a synthetic material and a metal and further includes a piece of another metal provided on the at least one streamer to prevent a corrosion of metallic parts of the streamer.

2. The array of claim 1, wherein the net is made of at least one of a synthetic material, a natural material, or a metal.

3. The array of claim 1, wherein the metal is selected to be disliked by the barnacles.

4. The array of claim 1, wherein the net is covered with a low-adhesion material or with an anti-stick material.

5. The array of claim 1, wherein the net includes one or more cells having a size smaller than an average size of a larva of an barnacle.

6. The array of claim 1, further comprising:
   plural reservoirs placed at various locations along the net for storing and releasing a chemical substance.

7. A method for providing a net over a streamer, the method comprising:
   rolling out the streamer from a vessel;
   providing over the streamer a net for preventing barnacles to attach to the streamer; and
   releasing the streamer covered with the net into water for performing seismic survey,
   wherein the net is made of a combination of a synthetic material and a metal and further includes a piece of another metal provided on the at least one streamer to prevent a corrosion of metallic parts of the streamer.

8. The method of claim 7, further comprising:
   attaching a first end of the net at a first end of a section of the streamer; and
   attaching a second end of the net at a second end of the section of the streamer.

9. The method of claim 8, further comprising:
   cutting the net at the second end.

10. The method of claim 8, further comprising:
    impregnating the net with a chemical substance disliked by a marine animal.

11. The method of claim 8, further comprising:
    providing the net around the streamer such that the net is allowed to vibrate relative to the streamer.

12. The method of claim 7, wherein the net includes plural portions, each portion covering a corresponding section of the streamer.

13. The method of claim 7, further comprising:
    covering the net with a low-adhesion material or with an anti-stick material.

14. The method of claim 7, further comprising:
    providing the net to include one or more cells having a size smaller than an average size of a larva of a barnacle.

15. The method of claim 7, further comprising:
    attaching plural reservoirs at various locations along the net for storing and releasing a chemical substance.

16. A method for removing a net from a streamer when the streamer is brought back on a vessel, the method comprising:
    releasing a streamer, from the vessel, into water, wherein at least a section of the streamer is covered with a net;
    recording seismic data with the streamer;
    retrieving the streamer back on the vessel; and
    removing the net from the at least a section of the streamer when the streamer is on the vessel,
    wherein the net is made of a combination of a synthetic material and strands of at least two different metals that are configured to generate an electric current when placed underwater.

17. An array of streamers to be used for a seismic survey, the array comprising:
    at least one streamer including first and second sections, each section including at least a receiver for recording seismic data; and
    a net provided over the first section to prevent barnacles to attach to the at least one streamer,
    wherein the net is made of a combination of a synthetic material and strands of at least two different metals that are configured to generate an electric current when placed underwater.

* * * * *